US012804476B2

(12) United States Patent
Sibel et al.

(10) Patent No.: US 12,804,476 B2
(45) Date of Patent: Nov. 17, 2026

(54) RESOURCE RESERVATION METHOD IN PRIVATE WIRELESS COMMUNICATION NETWORK

(71) Applicant: MITSUBISHI ELECTRIC CORPORATION, Tokyo (JP)

(72) Inventors: Jean-Christophe Sibel, Rennes Cedex (FR); Qianrui Li, Rennes Cedex (FR); Nicolas Gresset, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 242 days.

(21) Appl. No.: 18/839,603

(22) PCT Filed: Jul. 15, 2022

(86) PCT No.: PCT/JP2022/028552

§ 371 (c)(1),
(2) Date: Aug. 19, 2024

(87) PCT Pub. No.: WO2023/181436

PCT Pub. Date: Sep. 28, 2023

(65) Prior Publication Data

US 2025/0168711 A1 May 22, 2025

(30) Foreign Application Priority Data

Mar. 24, 2022 (EP) .................................... 22305359

(51) Int. Cl.
*H04W 28/26* (2009.01)
*H04B 17/373* (2015.01)
(Continued)

(52) U.S. Cl.
CPC .......... *H04W 28/26* (2013.01); *H04B 17/373* (2015.01); *H04W 72/51* (2023.01); *H04W 72/54* (2023.01); *H04W 72/563* (2023.01)

(58) Field of Classification Search
CPC ..... H04W 28/26; H04W 72/51; H04W 72/54; H04W 72/563; H04W 24/02;
(Continued)

(56) References Cited

U.S. PATENT DOCUMENTS

2019/0159073 A1* 5/2019 Tang .................... H04W 28/24
2023/0199448 A1* 6/2023 Cho ......................... G08G 1/22
(Continued)

FOREIGN PATENT DOCUMENTS

WO WO 2017/136001 A1 8/2017

OTHER PUBLICATIONS

Hajrasouliha et al., "Dynamic geo-based resource selection in LTE-V2V communications using vehicle trajectory prediction", Computer Communications, vol. 177, Aug. 9, 2021, pp. 239-254.
(Continued)

*Primary Examiner* — Afshawn M Towfighi
(74) *Attorney, Agent, or Firm* — Birch, Stewart, Kolasch & Birch, LLP

(57) ABSTRACT

A resource reservation method in a private wireless communication network comprises:

Obtaining a trajectory, a velocity and a radio communication range for each terminal;

Identifying, from obtained data, whether there is a space area and a corresponding time interval where at least two radio communication ranges are going to intersect;

In the case of intersection, identifying whether there is a risk of collision in said time interval between packets to be sent or received by the terminals whose radio communication ranges intersect;

In the case where a risk of collision is identified, generating assistance data in the form of preferred and/or non-preferred radio resources from metric values stored in a database and transmitting the generated assistance data to at least one terminal; and (Continued)

Using, by said at least one terminal, the generated assistance data transmitted by the application server for adapting radio resource reservation.

8 Claims, 5 Drawing Sheets

(51) Int. Cl.
*H04W 72/51* (2023.01)
*H04W 72/54* (2023.01)
*H04W 72/563* (2023.01)

(58) Field of Classification Search
CPC ........... H04W 28/021; H04W 28/0236; H04W 4/029; H04W 4/025; H04W 4/027; H04W 64/006; H04W 84/005; H04W 4/40; H04B 17/373; B61L 27/20; B61L 27/40; B61L 15/0027; H04L 47/781; H04L 47/824
See application file for complete search history.

(56) References Cited

U.S. PATENT DOCUMENTS

2024/0080868 A1* 3/2024 Selvanesan ........... H04W 72/40
2025/0168711 A1* 5/2025 Sibel ................... B61L 15/0027

OTHER PUBLICATIONS

Nokia et al., "Discussion of Resource Allocation for Sidelink-Mode 1", 3GPP Tsg Ran WG1 Meeting #98bis, RI-1910513, Chongqing, China, Oct. 14-20, 2019, total 6 pages.
The International Search Report (PCT/ISA/210) issued in PCT/JP2022/028552, mailed on Dec. 19, 2022.
The Written Opinion of the International Searching Authority (PCT/ISA/237) issued in PCT/JP2022/028552, mailed on Dec. 19, 2022.

* cited by examiner

RESOURCE RESERVATION METHOD IN PRIVATE WIRELESS COMMUNICATION NETWORK

TECHNICAL FIELD

At least one of the present embodiments generally relates to a method for resource reservation. At least one of the present embodiments also relates to a device configured to implement the method.

BACKGROUND ART

In a Vehicle-to-everything (V2X) communication system information may be exchanged between a vehicle and any entity, e.g. another vehicle, a pedestrian, infrastructure entities such as road-side units (RSU). While previous versions of V2X communication designed as LTE C-V2X were built on top of LTE cellular networks, most recent versions of V2X communications designed as NR (acronym of New Radio) V2X in 3rd Generation Partnership Project (3GPP) are built on top of 5G cellular networks. In NR V2X, the transmission can be done through a sidelink (SL) between two user equipments (UE). Two sidelink communication modes are defined. In SL mode 1, a base station (BS) controls the SL transmission. In SL Mode 2, a UE performs sensing and autonomously, i.e. without assistance of a base station, selects a radio resource from a pool of radio resource candidates for its direct communication with another UE over a so-called PC5 interface. A radio resource or more simply a resource is defined by a time-frequency slot. A UE performing radio resource reservation as specified in 3GPP NR V2X SL mode 2 is configured to perform three steps.

In a first step, the UE tries to hear other UEs in local radio resources in a sensing window $[t_0; t_1]$ of typically 1 s, where $t_0$ and $t_1$ are time instants. The UE thus obtains a map of the resources reserved by others and of the free resources, i.e. resources not used by any other UE. In a second step, the UE randomly selects radio resources to use for its own transmission among the free resources identified thanks to the sensing. In a third step, the UE uses the selected resources for its transmissions in a so-called reservation window $[t_1; t_2]$ of typically 1 to 500 ms where $t_2$ is a time instant.

NR V2X SL mode 2 further considers SPS (English acronym of "Semi-Persistent Scheduling") for periodic traffic. Once one or multiple resources are selected, the UE repeat the resource reservation N times, N being an integer, without repeating neither the resource sensing step nor the resource selection step. In other words, the UE periodically uses the same resources in a reservation window $[t_1; N*t_2]$ of typically 1 ms to 15 s. Since the SPS reservation may last for several seconds, the sensing made over 1 s before the resource selection is quickly outdated. As the propagation condition evolves, the sensing information used for reservation becomes obsolete and collisions may happen.

In Release 17 of 3GPP NR V2X, a new feature called "InterUE-coordination" is considered for improving reliability of resource reservation by avoiding the problem of hidden node and thus limiting collisions. It makes it possible for a first UE to provide assistance to a second UE which obverses more or less the same channel but at a distant spatial position. More precisely, the first UE is configured to share its sensing results with the second UE such that the second UE takes benefit from an extended sensing. Thanks to this new feature, the second UE may be aware of UE located outside its communication range but inside the communication range of the first UE. This feature provides an extended sensing in space but not in time and thus cannot resolve the problem of outdated sensing.

Besides, given the limited sensing capability in time and space of the UEs, e.g. because of the communication range R and the sensing window $[t_0; t_1]$, the UEs often encounter the problem of hidden incoming node, e.g. a node is a UE or more generally a terminal. This problem is illustrated by FIG. 1. Two user equipments $U_1$ and $U_2$ move along a path, e.g. a track. Their communication ranges depicted as circles intersect in a time window $[t_i; t_f]$ which correspond to a spatial area $[s_i; s_f]$. At the time $t_1<t_i$, $U_1$ ($U_2$ respectively) is not able to detect $U_2$ ($U_1$ respectively) because $U_1$ is outside of the communication range of $U_2$ and vice versa. If at a time before $t_i$, both $U_1$ and $U_2$ perform a resource reservation that results in the use of at least one common specific time-frequency resource and that lasts a sufficient amount of time (more likely with SPS) such that in $[s_i; s_f]$, at $[t_i; t_f]$, $U_1$ and $U_2$ lies within the communication range of the other with said reservations, there is a high risk of collision in the common reserved resources. Both UEs undergo packet collision until either the end of at least one SPS session or the end of their physical meeting.

It is thus desirable to find a resource reservation method that avoids the problems of outdated sensing and hidden incoming node and thus limits the risk of packet collision.

SUMMARY OF INVENTION

At least one of the present embodiments generally relates to a resource reservation method in a private wireless communication network comprising a set of terminals moving along a path, a set of road-side units located along the path in radio communication with the terminals and with an application server, the application server being connected to a database associating with each configuration of terminals in a given spatial area metrics values representative of how radio resources are used in said given spatial area. The method comprises:

- Obtaining by the application server the trajectory, velocity and radio communication range of each terminal;
- Identifying by the application server, from obtained trajectories, velocities and radio communication ranges, whether there is a space area and a corresponding time interval where at least two radio communication ranges are going to intersect;
- In the case where an intersection is identified, identifying by the application server whether there is a risk of collision in said time interval between packets to be sent or received by the terminals whose radio communication ranges intersect;
- In the case where a risk of collision is identified, generating by the application server assistance data in the form of preferred and/or non-preferred radio resources from said metric values stored in said database and transmitting the generated assistance data to at least one terminal; and
- Using, by said at least one terminal, the generated assistance data transmitted by the application server for adapting radio resource reservation.

The method disclosed limits the risk of packet collision by providing assistance data to the terminals, said assistance data being used to adapt their radio resource reservation so as to better orthogonalize their radio resource reservations.

In one embodiment, identifying by the application server whether there is a risk of collision between packets to be sent or received by the terminals whose radio communication ranges intersect comprises identifying that there is a risk of collision in the case where said terminals whose radio communication ranges intersect have at least one identical reserved radio resources.

In one embodiment, each configuration of terminals in the database being associated with a tag indicating whether said configuration is associated with difficult radio conditions, identifying by the application server whether there is a risk of collision between packets to be sent or received by the terminals whose radio communication ranges intersect comprises:

- Identifying in the database the configuration of terminals that is the closest to a current configuration of terminals;
- Identifying that there is a risk of collision in the case where the identified configuration is associated with a tag indicating that said configuration is associated with difficult radio conditions.

In one embodiment, generating by the application server assistance data in the form of non-preferred radio resources comprises:

- Identifying in the database the configuration of terminals that is the closest to a current configuration of terminals;
- deducing a collision rate for each radio resource from sensing data associated in the database with the identified configuration of terminals;
- determining the set of preferred and/or non-preferred radio resources from the collision rates.

In one embodiment, determining the set of preferred and/or non-preferred radio resources from the collision rate comprises determining a radio resource as a non-preferred radio resource in the case where said collision rate of is above a threshold value and as a preferred resource otherwise.

In one embodiment, generating by the application server assistance data in the form of preferred and/or non-preferred radio resources comprises:

- Identifying in the database the configuration of terminals that is the closest to a current configuration of terminals;
- deducing a probability of interference for each radio resource from sensing data associated in the database with the identified configuration of terminals;
- determining the set of preferred and/or non-preferred radio resources from the probabilities of interference.

In one embodiment, determining the set of preferred and/or non-preferred radio resources from the probabilities of interference comprises determining a radio resource as a non-preferred radio resource in the case where said probability of interference is above a threshold value and as a preferred resource otherwise.

In one embodiment, generating by the application server assistance data in the form of preferred and/or non-preferred radio resources comprises:

- Identifying in the database the configuration of terminals that is the closest to a current configuration of terminals;
- deducing values of degradation in transmission performance for each radio resource from sensing data associated in the database with the identified configuration of terminals;
- determining the set of preferred and/or non-preferred radio resources from values of degradation in transmission performance.

In one embodiment, determining the set of preferred and/or non-preferred radio resources from values of degradation in transmission performance comprises determining a radio resource as a non-preferred radio resource in the case where said values of degradation in transmission performance is above a threshold value and as a preferred resource otherwise.

In one embodiment, using, by said at least one terminal, the generated assistance data transmitted by the application server for adapting radio resource reservation comprises selecting, for a final pool of radio resource candidates, radio resources identified as preferred resources in both an initial pool of radio resource candidates and the assistance data.

In one embodiment, using, by said at least one terminal, the generated assistance data transmitted by the application server for adapting radio resource reservation comprises removing, from an initial pool of radio resource candidates, the radio resources identified as non-preferred resources in the assistance data.

A private wireless communication network is also disclosed. The private wireless network comprises a set of terminals moving along a path, a set of road-side units located along the path in radio communication the terminals and with an application server, the application server being connected to a database associating with each configuration of terminals in a given spatial area metrics values representative of how radio resources are used in said given spatial area. The application server and the terminals are configured to implement the resource reservation method according to anyone of the embodiments disclosed.

A computer program product is disclosed that comprises program code instructions that can be loaded in a programmable device, the program code instructions causing implementation of the resource reservation method according to anyone of the embodiments disclosed when the program code instructions are run by the programmable device.

A storage medium is disclosed that stores a computer program comprising program code instructions, the program code instructions causing implementation of the resource reservation method according to anyone of the embodiments disclosed 1 when the program code instructions are read from the storage medium and run by a programmable device.

The characteristics of the invention will emerge more clearly from a reading of the following description of at least one example of embodiment, said description being produced with reference to the accompanying drawings.

DESCRIPTION OF EMBODIMENTS

Figure 1:
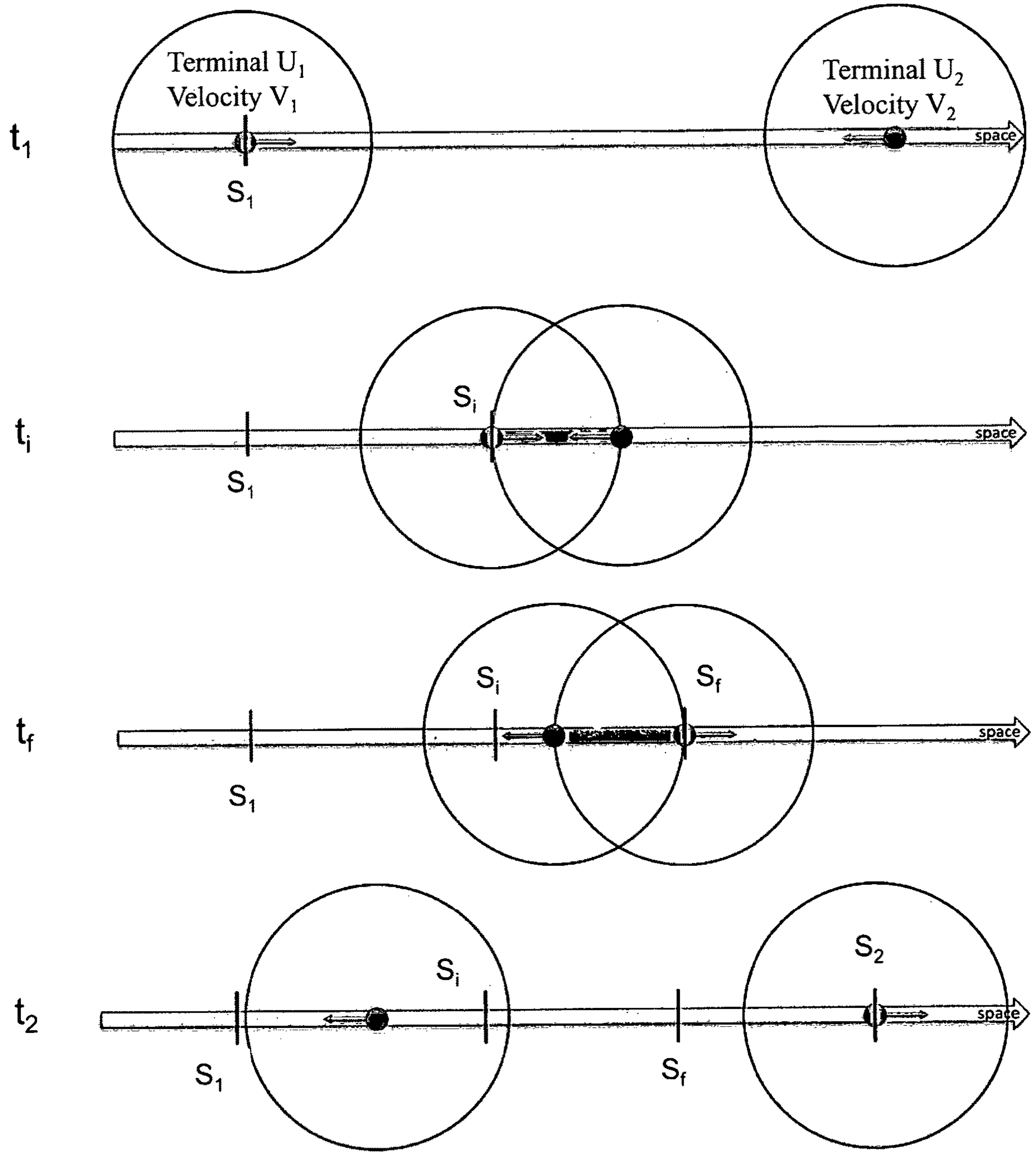
FIG. 1 illustrates the problem of hidden incoming node.
Figure 2:
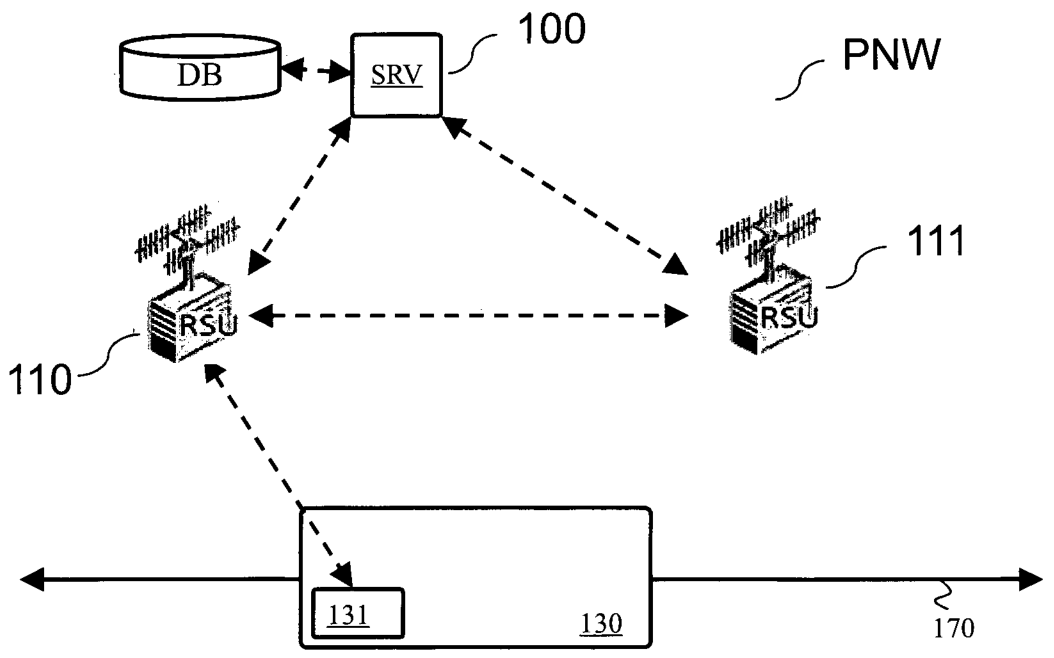
FIG. 2 depicts a private wireless communication network (PNW) wherein the present embodiments may be implemented.

FIG. 2 represents a private wireless communication network (PNW) wherein the present embodiments may be implemented. As an example, the PNW is a 5G private network for trains. In such a PNW, all terminals, e.g. a user equipment according to the 3GPP terminology, are perfectly identified and have a predictable trajectory. Each terminal is associated with a radio communication range that is static, e.g. 300 m around the terminal. The packet traffic at the application layer may be either statistically known, e.g. the average period, or exactly known, e.g. the exact time separation between any two consecutive application packets. The radio traffic is not known in advance, it relies on 3GPP NR V2X SL mode 2. The wireless communication network PNW comprises road-side units (RSU) 110, 111 located along a path, i.e. the track 170 on which a train 130 is running. Each terminal is in the communication range of at least one RSU.

The RSU 110, 111 offer services of the wireless communication network to UEs. The train 130 that receives/sends data regarding its trajectory's control or a terminal 131 located in the train 130 are examples of such UEs. The terminal 131 is for instance a mobile terminal or a relay station allowing mobile terminals located in the train to access the services of the wireless communication network via the RSU. Each RSU being a fixed radio terminal is able to transmit/receive control and data information with neighboring equipment, e.g. another RSU or one vehicle (e.g. one train). Each RSU is provided with some application layer features, such as encapsulation and decapsulation to read (to send respectively) data from/to an access layer to/from application layer, to be able to exchange information with any application server SRV.

The wireless communication network PNW further comprises at least one application server SRV configured to get information, e.g. the local channel environment, from each RSU. The server SRV may be an independent physical entity or an extended software entity distributed in all the RSUs. The SRV is further configured to compute radio-based metrics, e.g. Channel Busy Ratio (CBR) or Channel occupancy Ratio (CR). In addition, the SRV knows all the terminals in the private network, namely it knows their physical deployment and mobility, e.g. their spatial position, velocity, trajectory. These latter data may be known by the SRV with a certain granularity in time, e.g. every second in which case the SRV is able to interpolate between the sampled data to extrapolate a continuous prediction of the terminal's trajectory. The SRV is further able to associate a position in space and duration in time with any identified application packet attached to a terminal. SRV represents the application layer group of all RSUs. The RSUs are distinct physical entities but given their connection with the SRV, any terminal in the PNW targets the best RSU to reach the SRV and the SRV targets the best RSU to reach any terminal in the PNW. The best RSU is for example the RSU for which the channel is the most reliable or the RSU that is physically the closest to the terminal. The wireless communication network PNW further comprises a database DB. Database assistance is routinely used in navigation and radio communication services. The DB-assisted services usually rely on statistical data related to the users' experience in space and time. The DB is thus filled, e.g. during one week, with several metrics by considering numerous terminals crossing a given spatial area at various time instants. The metrics are representative of a radio situation from the point of view of the terminals indicating how the radio resources are used in the given spatial area. Therefore, the metrics can be computed from the sensing of the RSU and/or from the sensing of the terminals. During this timeframe, for each terminals' configuration (TC) a specific radio situation is thus stored. The metrics may correspond to a model of the wireless communication channel such as a channel power delay profile, to a fading level in different radiofrequency resources, to an interference level in different radiofrequency resources, to a power level in different radiofrequency resources, to a CBR, to one or more previous estimates of the instantaneous wireless communication. More generally, the metrics may correspond to any type of data related to a wireless communication channel experienced in the given spatial area that may be useful for a terminal to adjust its communication settings in the area.

Figure 3:
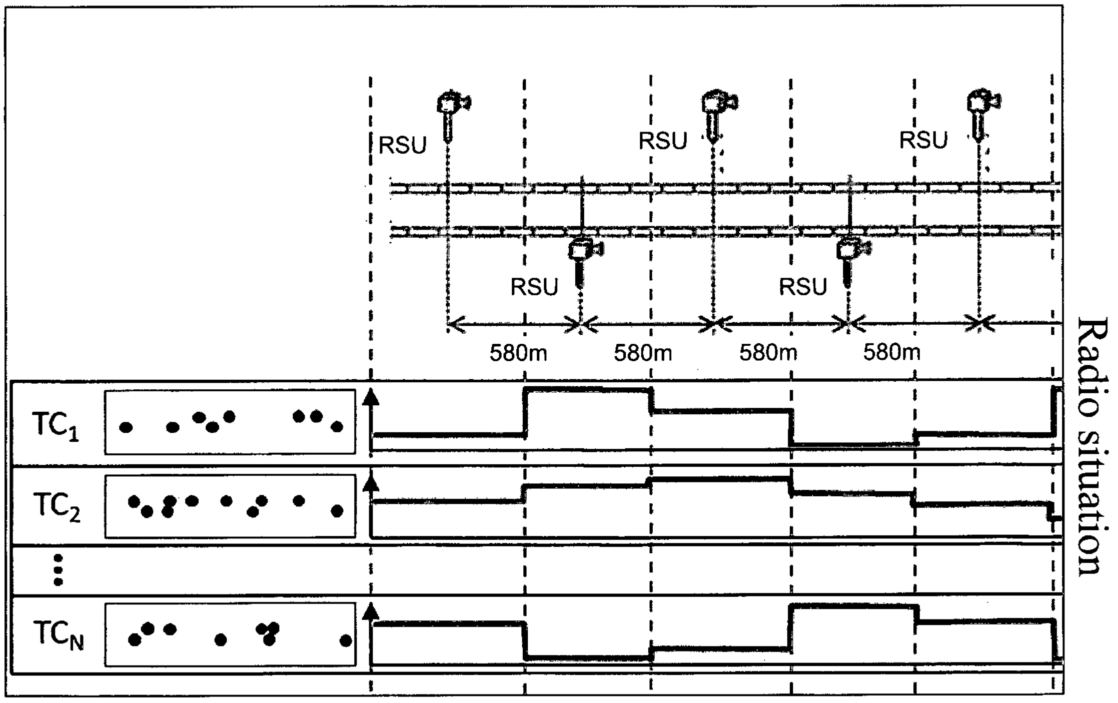
FIG. 3 depicts several configurations of terminals with associated metrics.

A terminals' configuration TC is defined as a spatial organization of a set of terminals (defined by spatial position of each terminal) with a certain velocity in the given spatial area. An example of Nb, e.g. Nb=10, such terminal configurations is depicted on FIG. 3. Each point represent a terminal in the given spatial area delimited by the rectangle. In each configuration, each terminal is associated with a given velocity. Therefore, in the DB each TC is associated with metric values representative of a radio situation, e.g. CBR values, representative of the radio situation measured by the RSUs located on the border of the given spatial area.

In order to limit the number of TC, an average processing may be performed such that for similar TC, the DB gets an average radio situation. Consequently, in the DB, for each registered TC an average radio situation is stored.

In a variant, no average is made. The DB only keeps the last measured metric values. This is a particular case where only one time instant is considered. The radio situation is thus recent but not representative of the past.

In another variant, the DB is a collection over time and space of instantaneous situations in which a specific TC implies a specific radio situation.

From the stored configurations in association with metrics representative of a radio situation, one is able to predict the radio situation of a current configuration $TC_{curr}$ by selecting as a prediction the metric values associated in the DB with the TC that is the closest to $TC_{curr}$.

Figure 4:
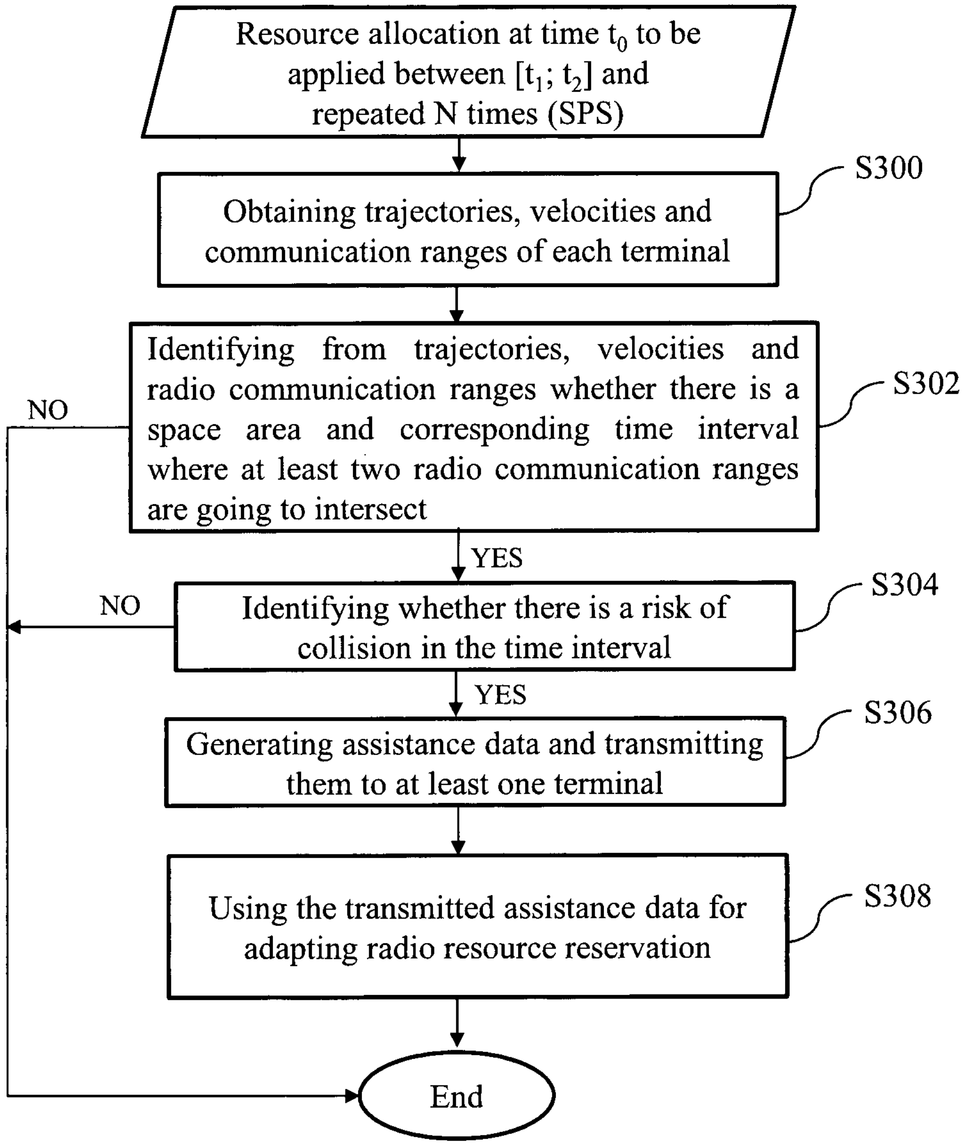
FIG. 4 illustrates a flowchart of a resource reservation method according to a specific embodiment.

FIG. 4 illustrates a flowchart of a resource reservation method according to a specific embodiment. The method is for example implemented in the application server SRV. For each terminals a resource reservation occurred at time $t_0$ (sensing between $[t_0; t_1]$, selection, resource reservation) which is to be applied between $[t_1; t_2]$ and repeated N times (SPS). There might be some time between the end of the sensing and the start of the reservation. This time being negligible, there is no need to take it into account.

In a step S300, the physical trajectory, velocity and radio communication range of each terminal are obtained by the SRV. For example, the SRV gets the trajectories, velocities and communication ranges from a memory where they are stored.

In a step S302, the SRV identifies from the trajectories, the terminals' velocities determined at S300 and further from the communication ranges which are known by the SRV whether there is a space area $[s_i; s_f]$ and consequently a corresponding time interval $[t_i; t_f]>t_0$ wherein the respective radio communication ranges of at least two terminals UE1 and UE2 are going to intersect. In the case where there is no such intersection, i.e. no space area $[s_i; s_f]$, the method ends for the at least two terminals UE1 and UE2.

In a step S304, it is detected whether there is a risk of collision between the packets to be sent/received by the at least two terminals UE1 and UE2 in $[t_i; t_f]$. More precisely, in the case where the respective radio communication ranges of the at least two terminals intersect, it is determined that there is a risk of collision in the case where some of their reserved radio resources are identical. In the case where a risk of collision is detected then the method continues at S306. In the case where no risk of collision is detected, e.g. because their resource reservation are disjointed, then the method ends.

It may be determined that the radio communication ranges intersect but that there is no risk of collision because the reserved radio resources are orthogonal. In one embodiment, a risk of radio collision in $[t_i; t_f]$ is detected from the reserved radio resources determined at time to and the periodicity of the SPS. Indeed, as soon as a terminal uses the resources that it selected, it transmits, in a part of the packet, the Sidelink Control Information (SCI) that indicates reservation details, e.g. the time-frequency position of its next reservation(s) and the periodicity of these reservations, if any.

In a second embodiment, the RSUs gather radio measurements, e.g. sensing reports, from the neighbouring terminals. The SRV aggregates information from the RSUs, comprising each RSU internal data such as the terminals' sensing but also the associated terminals' positions, velocity, density, etc. Through a learning process, the SRV is then able to construct a space-time map of radio resource used to associate with any terminals' configuration (TC) a status of interference as a function of space and time. Consequently, knowing the status of interference as a function of space and time, the TC associated with difficult radio conditions may be tagged as such in the database. In S304, the SRV identifies what TC the terminals belong to, or identifies the closest TC they belong to. If the said TC is associated with difficult radio conditions, a risk of collision is thus detected and the method continue to S306.

Figure 5:
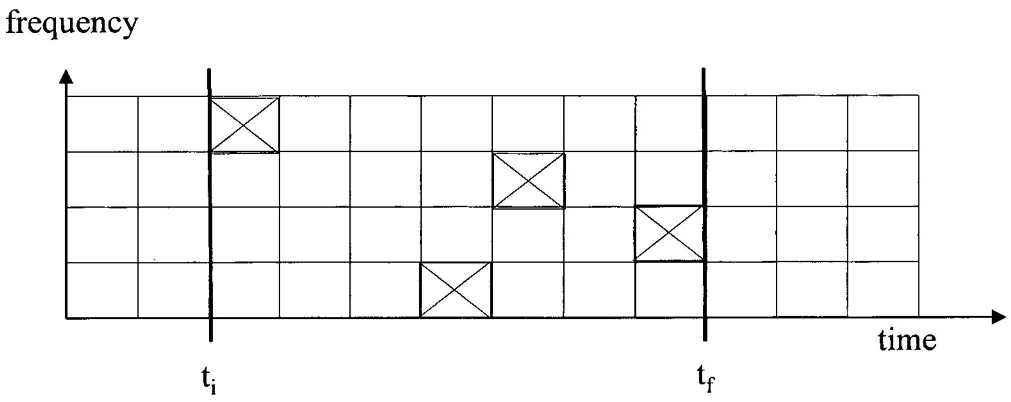
FIG. 5 depicts a table indicating preferred and non-preferred radio resources.

In a step S306, assistance data are generated by the SRV between $t_1$ and $t_i$ from data extracted from the database DB. The assistance data are, for example, in the form of non-preferred and/or preferred radio resources. In an example, the assistance data is provided as a table as depicted on FIG. 5 wherein for each radio resource in $[t_i; t_f]$, it is indicated whether the resource is a non-preferred radio resource or a preferred radio resource. On FIG. 5, the non-preferred radio resources are indicated by a cross whereas the preferred radio resources are left blank. These assistance data are then transmitted to at least one terminal before $t_i$ to inform it that it needs to adapt its resource reservation in $[t_i; t_f]$, e.g. by changing the frequency of the reserved resources or by considering the assistance data as a sensing result for its selection in case of a self-reevaluation of its resource reservation as provided by the standard 3GPP NR V2X SL mode 2, in order to limit the risk of packets' collision. At least one terminal uses the transmitted assistance data to adapt its pool of radio resource candidates in $[t_i; t_f]$. More precisely, the assistance data are used in a step S308 by the at least one terminal to adapt its initial pool of radio resource candidates so as to better orthogonalize radio resource reservation in $[t_i; t_f]$ and consequently to avoid collision. According to 3GPP NR V2X SL mode 2, the initial pool of radio resource candidates for a given terminal is obtained by excluding any resource whose SCI is decoded by the said terminal and whose Reference Signal Received Power (RSRP) measured by the terminal is above a preconfigured threshold.

To this aim, the InterUE-coordination mechanism of 3GPP NR Release 17 may be used. This mechanism makes it possible for a first terminal to share its sensing result with a second terminal which therefore benefits from an extended sensing. To this aim, the first terminal informs the second terminal of its set of preferred and/or non-preferred resources determined based on its sensing results. In an embodiment, the second terminal selects, for its final pool of radio resource candidates, the resources that are identified as preferred resources in both its initial pool of radio resource candidates and in the set of preferred resources transmitted by the first terminal. In another embodiment, the second terminal removes from its initial pool of radio resource candidates the set of non-preferred resources transmitted by the first terminal to obtain its final pool of radio resource candidates.

The same principles are used herein, SRV determines a set of preferred and/or non-preferred radio resource and transmits this set of preferred and/or non-preferred resources to UE1 and/or UE2 as assistance data. In one embodiment, at least one of the two terminals selects, for its final pool of radio resource candidates, the resources that are identified as preferred resources in both its initial pool of resource candidates and the assistance data sent by SRV. In a variant, at least one of the two terminals removes from its initial pool of radio resource candidates the set of non-preferred resources identified as such in the assistance data in order to obtain its final pool of radio resource candidates.

According to the specifications of the standard 3GPP TR 37.985 v17.0.0 (2021-12) "*Overall description of Radio Access Network* (*RAN*) *aspects for Vehicle-to-everything* (*V2X*) *based on LTE and NR* (*Release* 17)", Section 6.3.2.2, a first terminal provided with its final pool of resource candidates randomly selects a given number $N_r$ of resources from the said pool where $N_r$ depends on the terminal requirements and needs. For example, $N_r$ equals 3 to allow for an initial transmission and two retransmissions of a single packet. The size of the final pool of resource candidates should be greater than or equal x % of the pre-configured resource pool shared by the first terminal and other terminals, wherein x is set, for example, to 20, 35 or 50 depending on the traffic priority of the first terminal. The $N_r$ resources selected by the first terminal are then effectively used by the first terminal according to their time-frequency position for transmission and retransmissions of a packet. A packet transmitted, or retransmitted, on a resource by the first terminal contains, at least, a data and an SCI such that a second terminal is able to sense the said resource used by the first terminal by trying to decode the said SCI and by measuring the associated RSRP. When the said SCI is decoded by the second terminal and when the associated RSRP is above a pre-configured threshold of the second terminal, then the said resource, and potentially the next resources indicated in the said SCI, are said to be occupied or reserved by the first terminal and the second terminal does not include these said resources in its initial pool of resource candidates.

Figure 6:
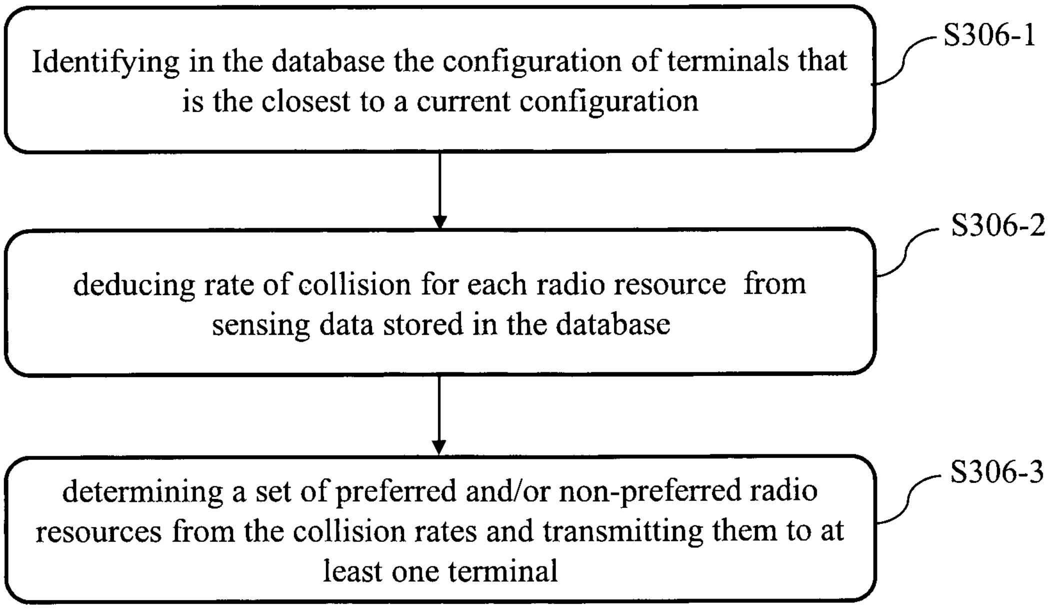
FIG. 6 illustrates in detail a step of the resource reservation method according to a specific embodiment.

FIG. 6 illustrates an exemplary embodiment of the step S306 of the resource reservation method.

In a step S306-1, the current terminals' configuration ($TC_{curr}$) is determined. The TC in the database that is the closest from $TC_{curr}$ is identified. The radio situation associated with the identified TC is then used as a prediction of the radio situation for the current terminals' configuration. To each space position for one TC close to one single registered TC, the DB gets a radio situation to be used as a prediction of the radio situation associated with $TC_{curr}$. This information (TC versus radio situation) may optionally be used in step S306-2.

In a step S306-2, from the sensing reports stored in the DB and associated with the TC identified in S306-1 as the closest to $TC_{curr}$, SRV deduces the future status of each resource r, e.g. the number of terminals that may use the resource r which amounts to the number of collisions for r.

By dividing this number by the number of resource reservations, SRV obtains a collision rate $\lambda_r$. By comparing the collision rates of all the resources, SRV is able to extract the resources more likely to host a serious collision. In a step S306-3, the collision rate $\lambda_r$ is compared with a preconfigured threshold to determine the set of non-preferred and/or preferred resources. In the case where the collision rate $\lambda_r$ is greater than a preconfigured threshold $\lambda_{TH}$ then the associated resource is tagged as a non-preferred resource and otherwise as a preferred resource. The set of non-preferred and/or preferred resources is then transmitted to the terminals.

In a first variant, the collision rate $\lambda_r$ per resource r is combined with a power level. Indeed, a resource collision results in interference if the associated signals physically collide implying that the terminals are capable of sensing the others. From the reports stored in the DB and associated with the TC identified in S306-1 as the closest to $TC_{curr}$, the SRV computes a number of interferences or a probability of interference regarding the associated power of each terminal. More precisely, the SRV being provided with the transmitted power of each terminal, it is able to predict for each resource, previously mentioned as hosting a collision in the near future, i.e. for which $\lambda_r > \lambda_{TH}$, a SIR (acronym of Signal-to-Interference Ratio). By comparing it to a first preconfigured threshold, the SRV is able to define a probability of interference, e.g. using the relative difference between the first threshold and the predicted SIR. In the case where the probability of interference is greater than a second preconfigured threshold, then the associated resource is tagged as a non-preferred resource in S306-3 and is tagged as a preferred resource otherwise. The set of non-preferred and/or preferred resources are then transmitted to the terminals.

In a second variant, link-level parameters can be associated with each TC in the database. In this case, the link-level parameters associated with the TC identified as the closest to $TC_{curr}$ in the step S306-1 are used to predict the performance of the transmission, e.g. the Packet Received Ratio (PRR), the Frame Error Rate (FER). Indeed, according to link-level parameters of the terminals, the interference might impact the performance of the transmission, e.g. the Packet Received Ratio (PRR), the Frame Error Rate (FER). Given a noise figure and a previously mentioned SIR, the SRV is able to deduce a SINR (acronym of Signal to Interference and Noise Ratio). The SRV being provided with a modulation and coding scheme to be used by the terminals, it is able to predict a frame error rate and/or a packet received ratio, used as usual performance metrics in such a scenario. In the case where the performance degradation, e.g. the FER, is greater than a preconfigured threshold then the associated resource is tagged as a non-preferred resource in step S306-3 and is tagged as a preferred resource otherwise. The set of non-preferred and/or preferred resources are then transmitted to the terminals.

The transmitted set of non-preferred and/or preferred resources used as assistance data in step S308 by the terminals may also be generated in S306 according to the various embodiments disclosed below.

In a first embodiment, SRV allows one terminal $U_1$ for freely selecting its resource. Then, upon the need for resource selection of $U_2$, $U_2$ is provided the set of non-preferred resources being the resources reserved by $U_1$. Generally, upon the need for resource selection of $U_{n>1}$, $U_n$ is provided the set of non-preferred resources being the resources reserved by $\{U_{k<n}\}$ k in E, where E represents the terminals potentially interfering.

In a second embodiment, from the TC identified in S306-1 as the closest to $TC_{curr}$, the SRV predicts what resources any terminal would select. According to the TCs, SRV extracts assistance data that lead to good radio situations in the past. Therefore, before any resource reservation, SRV transmits the assistance data to the terminals.

In a third variant, if SRV predicts too much interference in such a way that the distributed approach is too much detrimental to the performance, then SRV decides to schedule the terminals. Imitating a base station, SRV computes the exact set of preferred resources for each terminal in such a way that none set collide with any other set.

Figure 7:
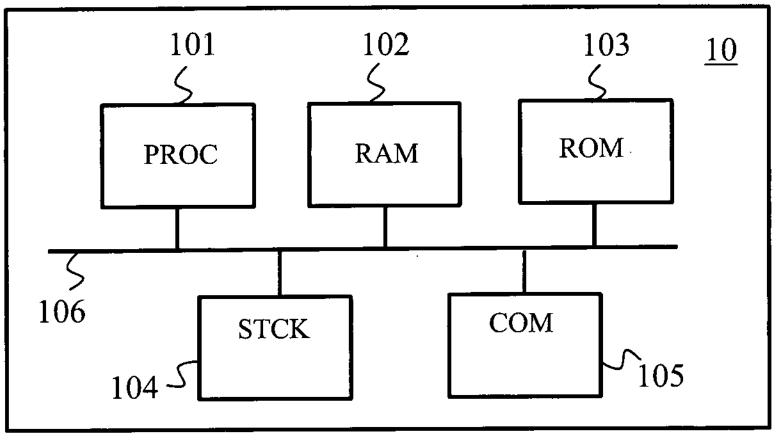
FIG. 7 illustrates schematically an example of hardware architecture of an application server configured to generate assistance data for resource reservation according to a specific embodiment.

FIG. 7 illustrates schematically an example of hardware architecture of an application server 10 configured to generate assistance data for resource reservation according to a specific embodiment.

The server 10 comprises, connected by a communication bus 106: a processor or CPU (acronym of "Central Processing Unit") 101; a random access memory RAM 102; a read only memory ROM 103; a storage unit 104 such as a hard disk or such as a storage medium reader, e.g. an SD (acronym of "Secure Digital") card reader; and at least one set of communication interfaces COM 105 enabling the server 10 to transmit and receive data.

The processor 101 is capable of executing instructions loaded into the RAM 102 from the ROM 103, from an external memory (such as an SD card), from a storage medium (such as the HDD), or from a communication network. When the server 10 is powered up, the processor 101 is capable of reading instructions from the RAM 102 and executing them. These instructions form a computer program causing the implementation, by the processor 101, of the methods described in relation to FIGS. 4 and 6.

The methods described in relation to FIGS. 4 and 6 may be implemented in software form by the execution of the set of instructions by a programmable machine, for example a DSP (acronym of "Digital Signal Processor"), a microcontroller or a GPU (acronym of "Graphics Processing Unit"), or be implemented in hardware form by a machine or a dedicated component (chip or chipset), for example an FPGA (acronym of "Field-Programmable Gate Array") or an ASIC (acronym of "Application-Specific Integrated Circuit"). In general, the server 10 includes electronic circuitry adapted and configured for implementing the methods described in relation to FIGS. 4 and 6.

The invention claimed is:

1. A resource reservation method in a private wireless communication network comprising a set of terminals moving along a path, an application server being connected to a database associating with each configuration of terminals in a given spatial area metric values representative of how radio resources are used in said given spatial area, the method comprising:

- Obtaining by the application server a trajectory, a velocity and a radio communication range for each terminal;
- Identifying by the application server, from obtained trajectories, velocities and radio communication ranges, whether there is a space area and a corresponding time interval where at least two radio communication ranges are going to intersect;
- In the case where an intersection is identified, identifying by the application server whether there is a risk of collision in said time interval between packets to be sent or received by the terminals whose radio communication ranges intersect;
- In the case where a risk of collision is identified, generating by the application server assistance data in the form of preferred and/or non-preferred radio resources from said metric values stored in said database and transmitting the generated assistance data to at least one terminal, the metrics values corresponding to any type of data related to a wireless communication channel experienced in the given spatial area that may be useful for one terminal to adjust its communication settings in the area; and Using, by said at least one terminal, the generated assistance data transmitted by the application server for adapting radio resource reservation, the assistance data being in the form of non-preferred and/or preferred radio resources, wherein:

identifying by the application server whether there is a risk of collision between packets to be sent or received by the terminals whose radio communication ranges intersect comprises identifying that there is a risk of collision in the case where said terminals whose radio communication ranges intersect have at least one identical reserved radio resources;

wherein generating by the application server assistance data in the form of preferred and/or non-preferred radio resources comprises:

Identifying in the database the configuration of terminals that is the closest to a current configuration of terminals;

deducing a probability of interference for each radio resource from sensing data associated in the database with the identified configuration of terminals;

determining the set of preferred and/or non-preferred radio resources from the probabilities of interference, the set of preferred and/or non-preferred radio resources from the probabilities of interference comprises determining a radio resource as a non-preferred radio resource in the case where said probability of interference is above a threshold value and as a preferred resource otherwise;

wherein using, by said least one terminal, the generated assistance data transmitted by the application server for adapting radio resource reservation comprises selecting, for a final pool of radio resource candidates, radio resources identified as preferred resources in an initial pool of radio resource candidates or wherein using, by said least one terminal, the generated assistance data transmitted by the application server for adapting radio resource reservation comprises removing, from an initial pool of radio resource candidates, the radio resources identified as non-preferred resources.

2. The method according to claim 1, wherein generating by the application server assistance data in the form of preferred and/or non-preferred radio resources comprises:

Identifying in the database the configuration of terminals that is the closest to a current configuration of terminals;

deducing a collision rate for each radio resource from sensing data associated in the database with the identified configuration of terminals;

determining the set of preferred and/or non-preferred radio resources from the collision rates.

3. The method of claim 2, wherein determining the set of preferred and/or non-preferred radio resources from the collision rate comprises determining a radio resource as a non-preferred radio resource in the case where said collision rate is above a threshold value and as a preferred resource otherwise.

4. The method according to claim 1, wherein generating by the application server assistance data in the form of preferred and/or non-preferred radio resources comprises:

Identifying in the database the configuration of terminals that is the closest to a current configuration of terminals;

deducing values of degradation in transmission performance for each radio resource from sensing data associated in the database with the identified configuration of terminals;

determining the set of preferred and/or non-preferred radio resources from values of degradation in transmission performance.

5. The method of claim 4, wherein determining the set of preferred and/or non-preferred radio resources from values of degradation in transmission performance comprises determining a radio resource as a non-preferred radio resource in the case where said values of degradation in transmission performance is above a threshold value and as a preferred resource otherwise.

6. A private wireless communication network comprising a set of terminals moving along a path, a set of road-side units located along the path in radio communication the terminals and with an application server, the application server being connected to a database associating with each configuration of terminals in a given spatial area metrics values representative of how radio resources are used in said given spatial area wherein the application server and the terminals are configured to implement the method according to claim 1.

7. A non-transitory computer-readable medium storing a computer program comprising program code instructions, the program code instructions causing implementation of the method according to claim 1 when the program code instructions are run by a programmable device.

8. A non-transitory computer-readable medium storing a computer program comprising program code instructions, the program code instructions causing implementation of the method according to claim 2 when the program code instructions are read from the storage medium and run by a programmable device.

* * * * *